United States Patent

[11] 3,611,136

[72] Inventors Tomosuke Ito
 166 Suwa;
 Shinobu Hirose, 1420 Kamikotanaka, both of Kawasaki-shi, Kanagawa-ken, Japan
[21] Appl. No. 861,931
[22] Filed Sept. 29, 1969
[45] Patented Oct. 5, 1971

[54] SPRING-OPERATED FIELD STRENGTH MEASURING DEVICE IN AN ELECTROMAGNETIC-TYPE AMPEREMETER
5 Claims, 4 Drawing Figs.
[52] U.S. Cl. .................................................. 324/127
[51] Int. Cl. ................................................... G01r
[50] Field of Search .................................... 324/127; 24/241 PS; 294/16, 28, 100, 116, 117, 104

[56] References Cited
UNITED STATES PATENTS
1,956,786 5/1934 Bemis ............................ 24/241
2,326,909 8/1943 Wolferz ......................... 324/127
2,497,669 2/1950 Haley ............................ 324/127

Primary Examiner—Michael J. Lynch
Attorney—Auslander and Thomas

ABSTRACT: A spring-operated field strength-measuring device in an electromagnetic-type amperemeter comprising a stationary core member fixedly mounted on the housing of said amperemeter, a movable core member pivotally mounted on said housing for movement toward and away from said stationary core member, an operation handle portion integrally formed with said movable core member, a cam portion integrally formed with said movable core member, and a spring-loaded cam-engaging member abutting against said cam portion, said cam portion including a cam surface which is adapted to increase its radius of curvature from the rotation axis of said movable core member toward the point of action of the spring of said spring-loaded cam-engaging member.

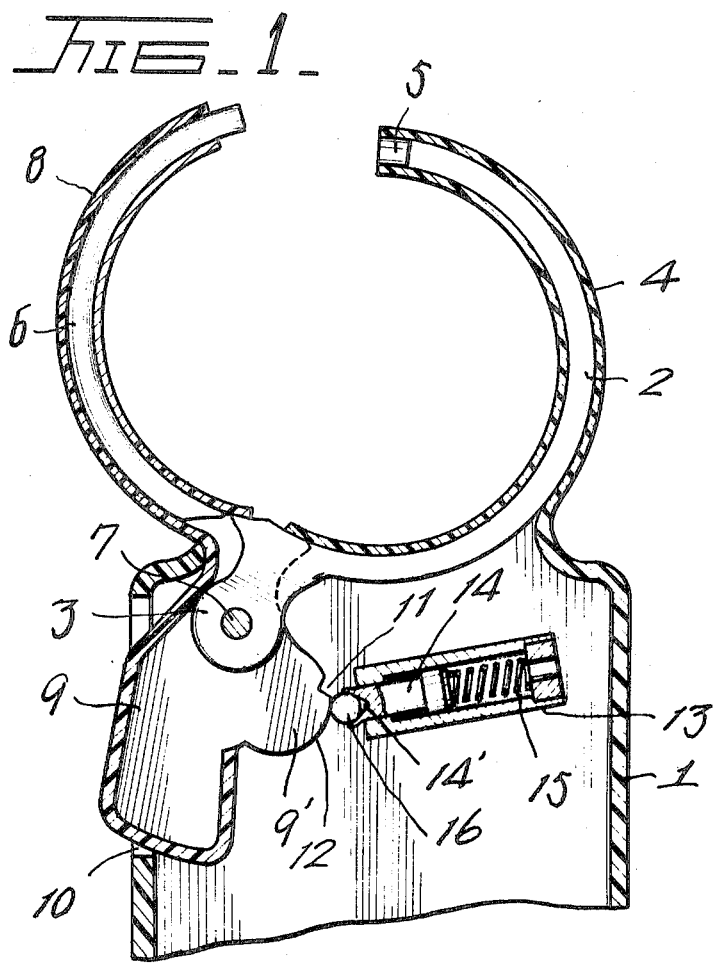

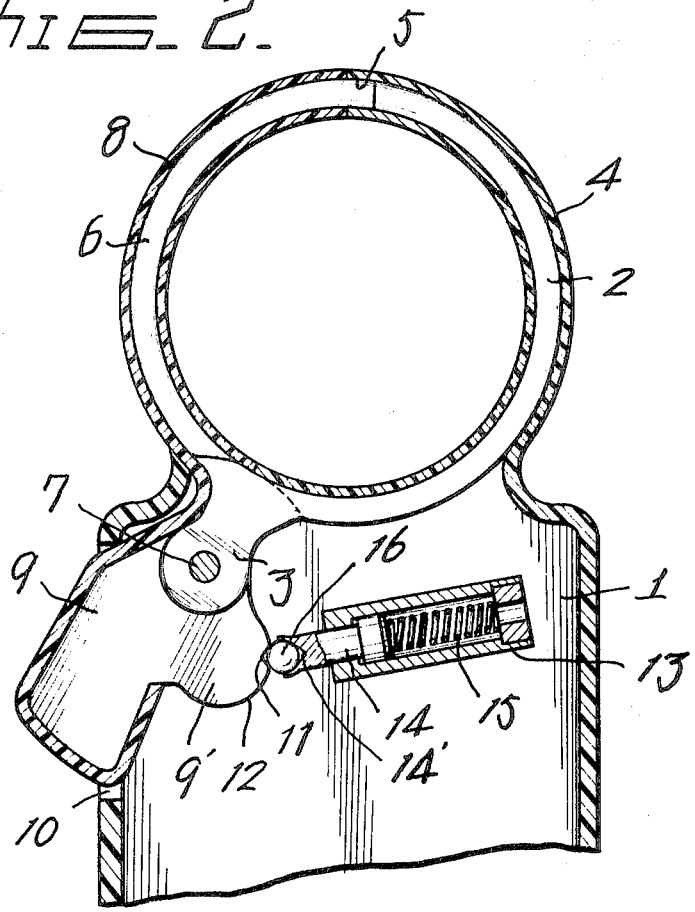
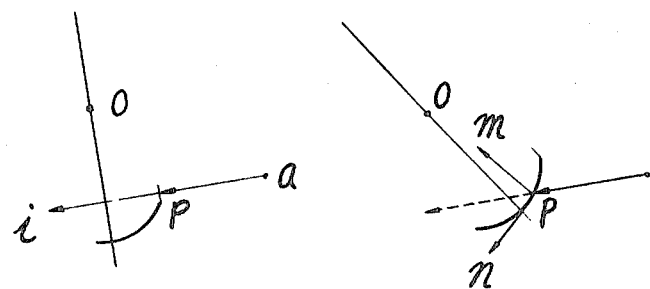

SPRING-OPERATED FIELD STRENGTH MEASURING DEVICE IN AN ELECTROMAGNETIC-TYPE AMPEREMETER

BACKGROUND OF THE INVENTION

There have been proposed spring-operated magnetic field strength measuring devices for an electromagnetic-type amperemeter of the prior art spring-operated field strength measuring devices includes as a principal part a pair of core members one of which is stationarily mounted on the housing of the amperemeter and the other of which is pivotally mounted on the housing for movement between the closing and opening positions relative to the stationary core member. A pulling spring is anchored at one end to the end of the movable member opposite to the end where the movable member is adapted to contact the stationary core member and at the other end to the housing. However, in such a conventional magnetic field strength measuring device as the movable core member is pivoted in the opening direction away from the stationary core member the force of the pulling spring becomes greater and greater. The spring force becomes weaker and weaker as the movable core member is pivoted in the opposite or closing direction and contacts the stationary core member with the minimum spring force which makes the contact between the core members insufficient. In another conventional magnetic field strength measuring device a pushing spring is employed in place of the above-mentioned pulling spring which is anchored at one end of the movable core member opposite to the end where the movable core member contacts the stationary core member and at the other end to the housing. However, even in such a conventional device positive contact cannot be obtained between the two core members for the same reason as mentioned just above in connection with the device in which the pulling spring is employed and there is the same disadvantages as explained in the first-mentioned field strength measuring device. In order to eliminate the above-mentioned disadvantage, it has been proposed that a stronger spring be used as the pulling or pushing spring in such a device. However, the use of a stronger spring requires a considerable amount of effort when the movable core members is to be pivoted in the opening direction.

The present invention relates to a magnetic field strength measuring device to be used as the measuring section of an electromagnetic-type amperemeter.

Therefore, one object of the present invention is to provide a spring-operated magnetic field strength measuring device in an electromagnetic-type amperemeter which can effectively eliminate the disadvantages inherent to the prior art magnetic field strength measuring devices in electromagnetic-type amperemeters.

Another object of the present invention is to provide a spring-operated magnetic field strength measuring device in which the cooperating core members can be positively held in their closed position with the full force of a spring. When the core members of the present invention are open only a fraction of the full force of the spring is applied to the core members whereby the operation of the measuring device may be made greatly easier and simpler.

According to the present invention, there is provided a magnetic field strength-measuring device in an electromagnetic-type amperemeter which comprises a stationary core member fixedly mounted at one end on the housing of said amperemeter; a movable core member pivotally mounted at one end on said housing for movement between first and second positions relative to said stationary core member; said movable core member being integrally formed with a manual handle and a cam portion; and a spring-loaded cam portion engaging means disposed in abutment against said cam portion, said cam portion including a cam surface the radius of curvature of which increases from the axis of the rotation of said movable core member toward the point of action of the spring of said spring-loaded cam portion-engaging means as the movable core member is pivoted toward said first direction.

The above and other objects and attendant advantages of the present invention will be more readily apparent to those skilled in the art from the following description when read in connection with the accompanying drawings which illustrate one preferred embodiment of the invention for illustration purpose only, but not for limiting the scope of the invention.

BRIEF DESCRIPTION OF THE DRAWINGS

FIG. 1 is a vertically sectional view of one preferred form of spring-operated magnetic field strength measuring device of an electromagnetic-type amperemeter constructed in accordance with the present invention showing said device in an opened position;

FIG. 2 is similar to FIG. 1, but shows said measuring device in its closed position; and FIGS. 3 and 4 are views showing the operation of said measuring device, respectively.

PREFERRED EMBODIMENT OF THE INVENTION

Description of the present invention will be now made referring to the accompanying drawings and more particularly, to FIGS. 1 and 2 thereof in which a typical or preferred form of spring-operated magnetic field strength measuring device of an electromagnetic-type amperemeter by the invention is shown in section. The magnetic field strength-measuring device generally comprises an electromagnetic-type amperemeter housing 1 in which an electromagnetic-type amperemeter (not shown) is mounted in the conventional manner and which has the conventional construction. A substantially semicircle stationary core member 2 is fixedly mounted at the lower end on the top of the housing 1 by means of a downwardly extending boss 3 integrally formed at the lower end. The core member 2 may be formed of any suitable conductive material and is covered with a plastic material coating layer 4. The other of upper end of the core member 2 terminates short of the adjacent end of the coating layer 4 so as to define a recess 5 for the purpose to be described hereinbelow. A similar substantially semicircle movable core member 6 is pivoted at the lower end to the top of the housing 1 by means of a transverse pin 7 which is suitably supported in the housing 1 in the conventional manner. The core member 6 is formed of the same conductive material as that of which the mating core member 2 is formed and also covered with a coating layer 8 which is formed of the same material as that of which the coating layer 4 for the core member 2 is formed. The core member 6 is formed at the lower end with an integral downwardly extending extension which forms an operation handle 9 and a cam portion 9' and the upper portion of which are pivotally mounted on the transverse pin 7. The outward or left-hand side portion of the handle-forming extension 9, 9' of the core member 6 extends out of the housing 1 through an opening 10 formed in the housing 1 and is exposed for manual operation. The upper end of the core member 6 extends beyond the adjacent end of the coating layer 8 and is adapted to be received in the recess 5 defined by the upper ends of the mating core member 2 and its coating layer 4 when the two core members 2 and 6 are closed as will be described hereinbelow. The inner or right-hand portion or cam portion 9' of the handle-forming extension is formed with a concaved first cam surface 11 and convexed second cam surface 12 which is continuous to the first cam surface. The second cam surface 12 has a larger radius of curvature than that of the first cam surface 11 for the purpose to be described hereinbelow. An elongated spring casing 13 is fixedly mounted within the housing 1 in a suitable manner and a cam-engaging rod 14 is slidably received within the casing 13. A spring 15 is disposed within the casing with one end anchored to one end wall of the casing 13 and the other end anchored to the cam-engaging rod 14 for urging the rod against the cam portion 9' of the handle-forming extension of the core member 6. The end of the cam-engaging rod 14 opposite to the spring 15 is formed with an recess 14' and a ball 16 is frictionally and rotationally received in the recess 14'.

The relationship between the position of the cam-engaging rod 14 and that of the spring 15 is illustrated in FIGS. 3 and 4 of the accompanying drawings in which FIG. 3 shows such a relation when the core members 2 and 6 are closed together while FIG. 4 shows the relation when the core members are opened. In these FIGS., it is assumed that the axis about which the pivotal core member 6 rotates is $o$ and the point of action of the spring force is $p$. Then when the magnetic field strength measuring device is in the position as shown in FIG. 3 the full force $a-p$ of the spring 15 functions as the turning force $p-i$ having the $o$ as the center. On the other hand, when the measuring device is in the position as shown in FIG. 4 the full spring force $a-p$ is divided into two portions, that is, $p-m$ and $p-n$ portions. Therefore, when the measuring device is in the position of FIG. 4 the turning force having the rotation axis $o$ as the center will be $p-n$ in which only fraction of the full spring force is utilized for pivotally moving the core member 6 and in other words, such a fraction of the full spring force is applied to the particular core member on the right-hand portion or cam portion 9' of the movable core member extension. For obtaining the above-mentioned operative advantage of the present invention according to the present invention, the arrangement of the cam portion 9' is so designed that when the core member 6 is pivoted toward its closing direction the force of the spring 15 is applied against the first cam surface 11 only in the direction in which the core member 6 is now pivoting toward its closing position and maintains the core member 6 in its closed position as shown in FIG. 1 and when the core member 6 is to be pivoted away from the mating core member 2 or in the opening direction the user pushes the handle 9 inwardly into the housing 1 against the force of the spring 15 so as to cause the ball and rod arrangement 16 and 14 to retreat into the casing 13 until the ball 16 disengages from the first cam surface 11 and then engages the second cam surface 12 which increases the radius of curvature from the rotation axis $o$ of the core member 6 toward the point of action $p$ of the spring 15 whereupon the handle 9 is released and then the pivotal core member 6 is held in its opened position due to the fact that the ball 16 abuts against the second cam surface 12 with a fraction of the full force of the spring 15. With the above arrangement of the cam portion 9', when the core member is to be pivoted toward its closing position or the mating core member 2, the full force of the spring 15 is imparted to the core member in such a pivotal movement whereby both the core members are positively held in their closed position with the full spring force. On the other hand, when the core member 6 is to be pivoted in the opening direction or away from the core member 2, manual force applied on the handle 9 resists the force of the spring 16 which otherwise urges the core member 6 toward the closing position and accordingly, only fraction of the full force of the spring is applied to the operator's hand which manipulates the handle 9 in the pivotal movement of the core member 6 in the opening direction and accordingly, it makes the manipulation of the measuring device quite easier and simpler. Therefore, as the spring 15 in the novel device, a spring which has a greater energy than those of the conventionally employed springs in the type devices to which the present invention pertains can be advantageously employed.

In operation, the core member 6 is first pivoted in the opening direction in the manner mentioned above and held in its opened position. Thereafter, the measuring device is positioned in a site where a wiring system exists in such a manner that the live wire in the system the ampere of which is to be measured can be encircled by the mating core members 2 and 6 in a spaced relation from the core members and then the core member 6 is pivoted in the closing direction in the manner as mentioned above whereupon a closed magnetic path is formed around the wire. The magnetic force of the magnetic path is measured by the electromagnetic-type amperemeter as the value in terms of the amperage of the wire.

While one preferred embodiment of the invention has been shown and described in detail it will be understood that the same is for illustration purpose only and is not to be taken as a definition of the invention, reference being had for this purpose to the appended claims.

1. A magnetic field-strength-measuring device in an electromagnetic clamp-on-type amperemeter which comprises a housing, a stationary core member fixedly mounted at one end on said housing of said amperemeter; a movable core member, said movable core member pivotally mounted at said same end on said housing as said stationary core; said movable core member being integrally formed with a handle and a cam portion; said handle being actuatable to move said movable core member away from said stationary core member from a closed position in which said members are in abutting relation to an open position in which said members are spaced apart, and a spring-loaded cam portion-engaging means disposed in abutment against said cam portion, said cam portion including a first, concave cam surface and a second, cam surface the radius of curvature of which increases from the axis of rotation of said movable core member toward the point of abutment of said spring-loaded cam portion-engaging means as the movable core member is pivoted inward toward said closed position where the first cam surface locks the core members in abutting relation.

2. A magnetic field strength measuring device in an electromagnetic amperemeter as set forth in claim 1, in which said cam portion engaging means comprises a casing fixedly mounted on said housing, a rod slidably disposed within said casing, a spring disposed within said casing with one end anchored to one wall of the casing and the other end anchored to one end of said rod and a ball received at the other end of the rod and being urged to abut against said cam portion by said spring thereby to urge the movable core member toward said second position.

3. A magnetic field strength measuring device in an electromagnetic type amperemeter as set forth in claim 1, in which said core sections are normally in juxtaposed position.

4. A magnetic field strength measuring device in an electromagnetic type amperemeter as set forth in claim 1, in which said handle includes said cam portion, said handle being pivotally mounted with said movable core member, said cam portion extending inward of said housing.

5. A magnetic field strength measuring device in an electromagnetic type amperemeter as set forth in claim 1, in which said core members include coating layers, the coating layer on one said core member extending short of said core member end, the said coating layer on said other core member extending beyond said core member end, said coating layers covering both said core members when said core members are normally juxtaposed.